(12) United States Patent
Zhou

(10) Patent No.: US 9,859,822 B2
(45) Date of Patent: Jan. 2, 2018

(54) CONTROL SYSTEM FOR REALIZING THE CHANGE OF INPUT POWER WITH LOAD AND ROTATING SPEED SIMULTANEOUSLY, BY DRIVING MULTIPLE ELECTRIC MOTORS VIA ONE INVERTER BRIDGE

(76) Inventor: Shunxin Zhou, Hubei (CN)

( * ) Notice: Subject to any disclaimer, the term of this patent is extended or adjusted under 35 U.S.C. 154(b) by 981 days.

(21) Appl. No.: 14/238,179

(22) PCT Filed: Jun. 28, 2012

(86) PCT No.: PCT/CN2012/000885
§ 371 (c)(1),
(2), (4) Date: Jun. 3, 2014

(87) PCT Pub. No.: WO2013/020355
PCT Pub. Date: Feb. 14, 2013

(65) Prior Publication Data
US 2017/0163180 A1   Jun. 8, 2017

(30) Foreign Application Priority Data
Aug. 11, 2011   (CN) .......................... 2011 1 0231539

(51) Int. Cl.
*G05F 1/70*   (2006.01)
*H02P 6/04*   (2016.01)
(Continued)

(52) U.S. Cl.
CPC .............. *H02P 6/04* (2013.01); *H02P 23/26* (2016.02); *H02P 27/08* (2013.01); *H02P 2201/15* (2013.01)

(58) Field of Classification Search
CPC .. H02M 2007/53876; H02P 6/085; H02P 6/16
See application file for complete search history.

(56) References Cited

U.S. PATENT DOCUMENTS

2006/0197491 A1* 9/2006 Nojima ............... H02M 7/487
                                                        318/801
2007/0247104 A1  10/2007 Garza
(Continued)

FOREIGN PATENT DOCUMENTS

CN      2122450 U      11/1992
CN      101262192       9/2008
(Continued)

OTHER PUBLICATIONS

Lu et al., "Practical Manual for Electromotor Energy-saving Reconstruction", Implementation Guidelines for National Standards of Economic Operation of Three-phase Asynchronous Electromotor, Shanghai Scientific & Technical Publishers (1995), pp. 1-4.
(Continued)

*Primary Examiner* — Karen Masih
(74) *Attorney, Agent, or Firm* — Pearl Cohen Zedek Latzer Baratz LLP

(57) ABSTRACT

A control system to realize input power changing along with both loads and rotate speed by an inverter bridge dragging many sets of motors, is composed of a stator voltage regulating unit (1), a motor unit (2), a rotor speed control unit (3), an inverter bridge unit (4), a control drive unit (5) and a signal processing unit (6). By setting a power factor sensor, the phase voltage and phase current of the motor stator are acquired as a control signal to regulate the input power so as to make it change with loads. At the same time, by setting a voltage sensor and a current sensor, motor rotor phase voltage, rectifier output current, overvoltage protection current and chopper working current are acquired separately as a control signal to regulate the input power so as to make it change with the rotate speed, thus realizing input power changing along with both loads and rotate speed.

9 Claims, 4 Drawing Sheets

(51) Int. Cl.
    *H02P 27/08*    (2006.01)
    *H02P 23/26*    (2016.01)

(56) References Cited

U.S. PATENT DOCUMENTS

2010/0033123 A1    2/2010    Zhou
2011/0057585 A1    3/2011    Zhou

FOREIGN PATENT DOCUMENTS

| | | |
|---|---|---|
| CN | 101320958 A | 12/2008 |
| CN | 100589318 C | 2/2010 |
| CN | 101340174 B | 8/2010 |
| CN | 202135093 U | 2/2012 |
| EP | 1796259 A2 | 6/2007 |
| EP | 1796259 A3 | 9/2015 |
| JP | 2001178192 | 6/2001 |
| JP | 2005341799 | 12/2005 |

OTHER PUBLICATIONS

International Search Report application No. PCT/CN2012/000885 dated Feb. 14, 2013.

\* cited by examiner

CONTROL SYSTEM FOR REALIZING THE CHANGE OF INPUT POWER WITH LOAD AND ROTATING SPEED SIMULTANEOUSLY, BY DRIVING MULTIPLE ELECTRIC MOTORS VIA ONE INVERTER BRIDGE

CROSS-REFERENCE TO RELATED APPLICATIONS

This application is a National Phase Application of PCT International Application No. PCT/CN2012/000885, International Filing Date Jun. 28, 2012, claiming priority of Chinese Patent Application No. 201110231539.4, filed Aug. 11, 2011, which is hereby incorporated by reference.

FIELD OF THE INVENTION

The present invention relates to a control system for driving multiple electric motors via one inverter bridge; and in particular, to a control system for realizing the change of input power with load and rotating speed simultaneously, by driving multiple electric motors via an inverter bridge.

BACKGROUND OF THE INVENTION

Nowadays, electrical energy is basically converted into mechanical energy via electric motors worldwide. An overseas survey shows that, in USA, Japan, France and Russia, the electrical energy consumed by electric motors accounts more than 60% of the overall industrial electrical energy consumption; and as investigated by related authorities, in the main electric grids in China, the electrical energy consumed by electric motors accounts 60%-68% of the overall industrial electrical energy consumption, which is approximately the same as that in developed countries. Therefore, countries all over the world are developing and popularizing various advanced technologies and devices so as to prompt the economical operation of electric motors. In China, remarkable effects and experiences have been obtained in the developing and adopting of various apparatuses and technologies that prompt the economical operation of electric motors.

With the development of electrical and electronic technologies, microelectronic technologies, control technologies and other technologies such as manufacturing processing, various speed-regulating apparatuses appear, among which, a frequency-changing type speed-regulating apparatus has the best performance and developing prospect. Particularly, with the application of vector-control technologies and direct torque control technologies, frequency-changing technologies become mature and take a leading position in AC driving due to its broad speed-regulating range, high speed-stabilization precision, rapid dynamic response and its performance of reversible operation in the four quadrants of a rectangular coordinate system. The speed-regulating performance of the frequency-changing technologies is comparable to DC driving. There is a trend that DC driving will be replaced by AC driving.

At present, globally well-known enterprises, including Siemens Electrical Drives Ltd. of Germany, Vaasa Control System Co., Ltd. of Finland, ABB of Switzerland, Schneider Electric Co. of France and Yaskawa of Japan, etc., are dominating the manufacturing of those commercialized large-scale electrical and electronic devices and frequency-changing devices. Products of the above industrially developed countries are also found in related application fields in China. In applying these products, however, one frequency inverter is employed for one electrical function, and one inverter bridge has to be provided for one frequency inverter. If an energy feedback function is required for the frequency-changing type speed-regulating system, another inverter bridge has to be added. Apparently, above configuration not only makes the system bulky and complex with poor stability, but also deteriorate the maintainability and performance-price ratio.

In view of above defects in prior art frequency-changing technologies, the inventor has conducted a large amount of experiments in cranes, oil pumping units used in oil fields, water injection pumps and steel ball machines, etc., on how to realize rotor frequency-changing type speed-regulating simultaneously by driving multiple electric motors asynchronously via an inverter bridge. In addition, a cabinet body and a tank body are designed and manufactured for AC and DC devices, thereby batch production and application are implemented, and a good effect is obtained. In this regard, three Chinese patents have been applied and authorized successively, with patent numbers ZL 200810094147.6, ZL 200810048732.2 and ZL 200810048252.2, respectively.

However, in an electric driving system, on one hand, there exists a power balance equation of electric motors:

$$P1 = 3U1I1 \cos \varphi 1$$

Wherein
P1—electric motor input power (KW);
U1—stator winding phase voltage (KV);
I1—stator winding phase current (A);
φ1—angle between the phase voltage and the phase current;
3 U1 I1 COS φ1—electric motor power factor.

On the other hand, for easy analysis, under the premise that no stator copper loss and iron loss of an electric motor and no rotor mechanical loss are considered:

$$P1 = P2 + PS$$

Here, P2—electric motor output power, i.e., load power;
PS—electric motor slip power, i.e., the power which is fed back to an electric grid or an electric motor by an inverter bridge after speed regulating of the electric motor.

Moreover, Ps=SP1;
Therefore, $$P1 = P2 + Ps$$
$$= P2 + SP1$$

Or, $$P2 = P1 - SP1$$
$$= P1(1 - S)$$

Based on that in an electric driving system, the slip ratio S of an electric motor is:

$$S = \frac{N_0 - N}{N_0} = 1 - \frac{N}{N_0}$$

Therefore, $$P_2 = P_1(1-S)$$
$$= P_1\left(1-\left(1-\frac{N}{N_0}\right)\right)$$
$$= P_1\frac{N}{N_0}$$

That is, $$P_1 = \frac{N_0}{N}P_2$$
$$= N_0\frac{P_2}{N}$$

Wherein,
N0—rotor synchronous rotating speed of an electric motor;
N—rotor instant rotating speed of an electric motor.

The rotor synchronous rotating speed of an electric motor No is a constant, therefore, it is seen from the above equation that: electric motor output power P1 relates simultaneously to electric motor output power P2 (i.e., load) and electric motor rotor instant rotating speed N.

In conclusion, it is clear that: an electric driving system has three working states: in the first working state, the rotor rotating speed of the electric motor keeps constant, while the system load changes instantaneously; in the second working state, the system load keeps constant, while the rotor rotating speed of the electric motor changes instantaneously; and in the third working state, both the system load and the rotor rotating speed of the electric motor change instantaneously.

The prior art designs of an electric motor fail to satisfy the requirements of an electric driving system, in other words, an electric motor can not operate constantly in a high-efficiency region by these designs. Furthermore, during the practical operation of an electric driving system, technicians only contribute to an electric driving system of above discussed first or the second working state. Electrical driving systems of the first and the second working states have been discussed in *Practical Manual For Energy-Saving Reforming On An Electric Motor* (published by Shanghai Science Publishing House) and related patent documents. However, with the rapid development of science and technology and the urgent need of energy saving, an electrical driving and controlling system applicable for above discussed third working state is desired.

SUMMARY OF THE INVENTION

It is an object of the present invention to provide a solution in view of the situation in which both the system load and the rotor rotating speed of the electric motor change instantaneously, that is, to provide an electric driving control system under the above discussed "third working state". This solution is a control system for realizing the change of input power with regard to both load and rotating speed. In other words, multiple electric motors are driven via one inverter bridge; on one hand, the input power changes with the instantaneous change of each load in the electric driving system; meanwhile, on the other hand, the input power changes with the instantaneous change of the rotating speed of each functional electric motor in the electric driving system. Moreover, each electric motor operates independently, and is synchronously coordinated and controlled in real time, without any interference.

Additionally, the invention also provides a function of energy feedback and recycling, that is, the AC current outputted by the inverter bridge is fed back to the electric grid or the electric motor in a manner of in-frequency and in-phase, so that the problem of "reverse power generation" of the electric motor may be solved, and the energy may be effectively saved.

To accomplish the above objects, the invention proposes the following technical solutions:

A control system for changing an input power according to both a load and a rotating speed, by driving multiple electric motors via one inverter bridge, the control system comprising:

a stator voltage-regulating unit 1, an electric motor unit 2, a rotor speed-regulating unit 3, an inverter bridge unit 4, a controlling and driving unit 5 and a signal processing unit 6, wherein:

the stator voltage-regulating unit 1 comprises a plurality of stator voltage-regulating modules (i.e., the first stator voltage-regulating module 1.1 to the $N^{th}$ stator voltage-regulating module 1.N) for detecting a power factor as the input voltage control signal, and then adjusting the input power by controlling the input voltage so as to make the input power change with the change of the load.

The electric motor unit 2 comprises a plurality of electric motors (i.e., the first electric motor M1 to the $N^{th}$ electric motor MN) for accomplishing each work in the electric driving system asynchronously and simultaneously.

The rotor speed-regulating unit 3 comprises a plurality of rotor speed-regulating modules (i.e., the first rotor speed-regulating module 3.1 to the $N^{th}$ rotor speed-regulating module 3.N) for detecting the rotor voltage and the chopper current as the input voltage control signal, and then adjusting the input power by controlling the input voltage so as to make the input power change with the change of the rotating speed.

The inverter bridge unit 4 is used for rectifying the AC current signals having different frequencies, which are output from the rotor of each functional motor, into DC signals, then inverting the DC signals into AC current signals having the same frequency and phase as those of the electric grids, and then feeding the electrical energy of the inverted AC current signals back to the electric grids or the electric motor effectively.

The controlling and driving unit 5 comprises a plurality of controlling and driving modules (i.e., the first controlling and driving module 5.1 to the $N^{th}$ controlling and driving module 5.N) for receiving the digital signals from the signal processing unit 6, performing digital processing and amplifying and driving, and controlling the stator voltage-regulating unit and the rotor speed-regulating unit, and realizing a real-time control for changing the input power according to both the load and the rotating speed.

The signal processing unit 6 comprises a plurality of signal processing modules (i.e., the first signal processing module 6.1 to the $N^{th}$ signal processing module 6.N) for receiving related signals detected by each sensor of the stator voltage-regulating unit and the rotor speed-regulating unit, performing signal processing and analog-digital conversion, sending digital signals to each corresponding controlling and driving unit, and performing real-time processing and controlling.

The technical solution of the invention is: on one hand, the real-time power factors of an electric motor (i.e., phase voltage and phase current of stator) are detected as the input voltage control signal of the whole system, and then, the input power is adjusted by controlling the input voltage control signal so as to make the input power change with the change of the load; at the same time, on the other hand, the rotor voltage of the electric motor, the rectifier output current, the overvoltage protection current and the working current of the chopper are detected as the input voltage control signal of the whole system, and then, the chopper is controlled by controlling the input voltage control signal, which is equivalent to adjusting the input power, so as to make it change with the change of the rotating speed. The detection of the above various signals are implemented by setting various sensors, and the corresponding change thereof is realized by microprocessors under the control of its master program.

The invention has the following beneficial effects: the invention designed based on the following consideration: software upgrading is more preferred than hardware upgrading, and at the same time, during developing, software debugging will not bring any physical damage to hardware. The invention employs a multi-microprocessor (CPU) operating system, develops a modularized circuit structure, an interface standard and signal processing technology. The invention implements a real-time control on the working state in which the input power changes according to both the load and the rotating speed, by a simply mechanical structure and hardware platform. Meanwhile, only one inverter bridge is used to guarantee that the slip power energy is effectively fed back to the electric grids or the electric motors. The invention has the characteristics of novel design, reasonable structure, reliable working, good maintainability, apparent energy-saving effect and broad application fields.

Figure 1:
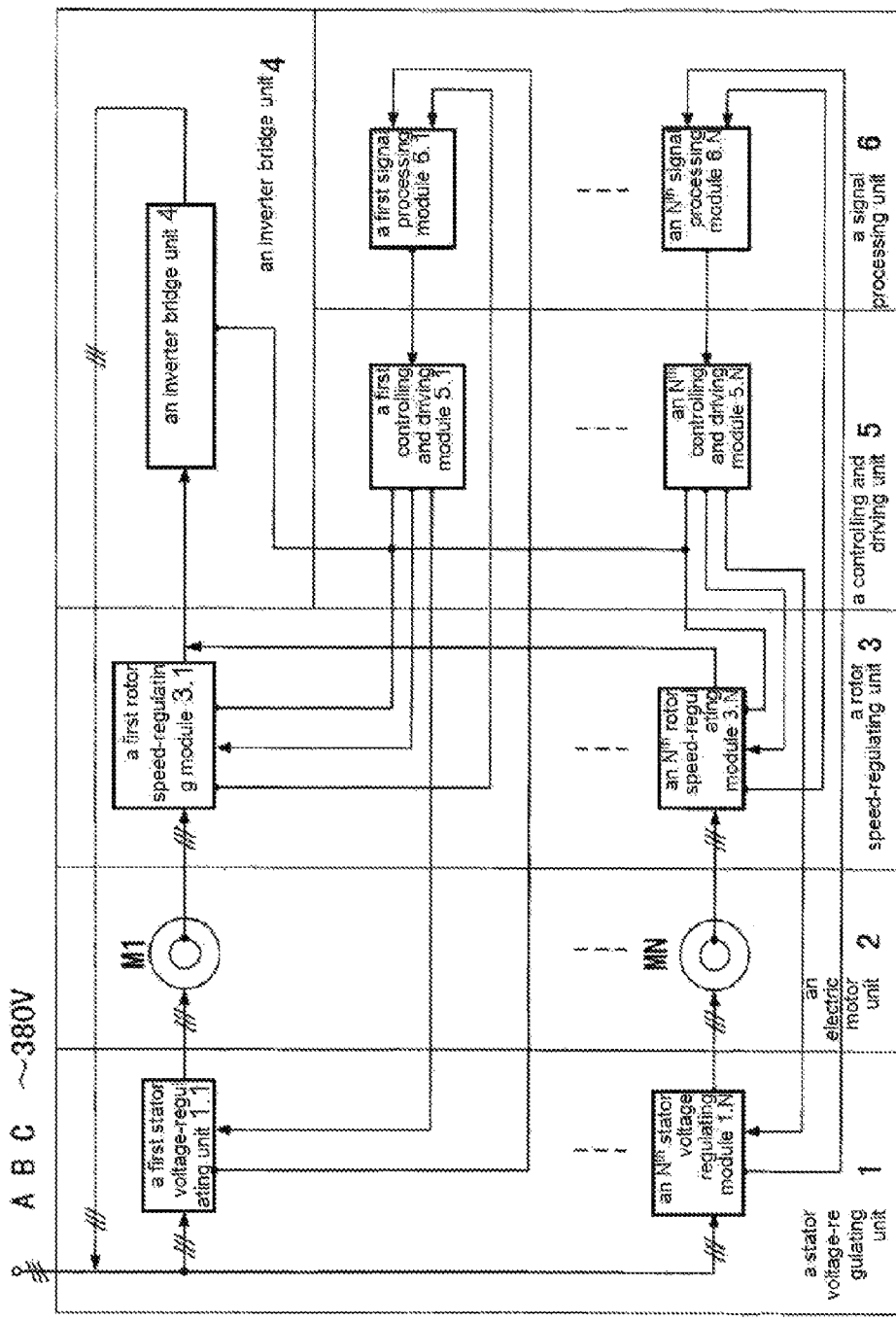
FIG. 1 is a functional block diagram of the circuit of the invention.

LIST OF REFERENCE SYMBOLS 1 stator voltage-regulating unit
1.1 the first stator voltage-regulating module
1.N the $N^{th}$ stator voltage-regulating module
G1-GN power factor sensor group
KP11, KP21, KP31-KP1N, KP2N, KP3N stator voltage regulator group
C11, C21, C31, C41, C51, C61-C1N, C2N1, C3N, C4N, C5N, C6N capacitor group
R11, R21, R31-R1N, R2N, R3N resistor group
U ϕ 1 and UI1 a phase voltage of any two phases in the three stators of the first electric motor M1, and a DC voltage converted from a phase current of any one phase in the three stators of the first electric motor M1
U ϕ N and UIN a phase voltage of any two phases in the three stators of the $N^{th}$ electric motor MN, and a DC voltage converted from a phase current of any one phase in the three stators of the $N^{th}$ electric motor MN
2 electric motor unit
M1 the first electric motor
MN the $N^{th}$ electric motor
3 rotor speed-regulating unit
3.1 the first rotor speed-regulating module
3.N the $N^{th}$ rotor speed-regulating module
Z1-ZN rectifier group
H1-HN hall voltage sensor group
H21, H31, H41-H2N, H3N, H4N hall current sensor group
IGBT1-IGBTN chopper group
UR1-URN overvoltage protector group
D11, D21, D31 and D11, D2N, D3N isolator group
C71-C7N filtering capacitor group
4 inverter bridge unit
L1 reactor
KP4, KP5, KP6, KP7, KP8, KP9 silicon controlled rectifier
C8, C9, C10, C11, C12, C13, C14, C15, C16, C16, C17, C18, C19 capacitor
R4, R5, R6, R7, R8, R9 resistor
U1 a phase voltage of any two phases in the three rotors of the first electric motor M1
UN a phase voltage of any two phases in the three rotors of the $N^{th}$ electric motor MN
UDI1 and UDIN DC voltages converted from the output DC current of rectifier Z1 and ZN, respectively
UDY1 and UDYN DC voltages converted from the overcurrent that flows through protector UR1 and URN, respectively
UTI1 and UTIN DC voltages converted from the current that flows through the anode of chopper IGBT1-IGBTN, respectively
5 controlling and driving unit
5.1 the first controlling and driving module
5.N the $N^{th}$ controlling and driving module
U51-U5N triggering driver group
6 signal processing unit
6.1 the first signal processing module
6.N the $N^{th}$ signal processing module
U11-U1N signal processor group
U21-U2N analog-to-digital converter group
UM1-UMN on-line working voltage

DETAILED DESCRIPTION OF THE EMBODIMENTS

Referring to FIGS. 1-4, the specific embodiments of the invention are shown.

Figure 2:
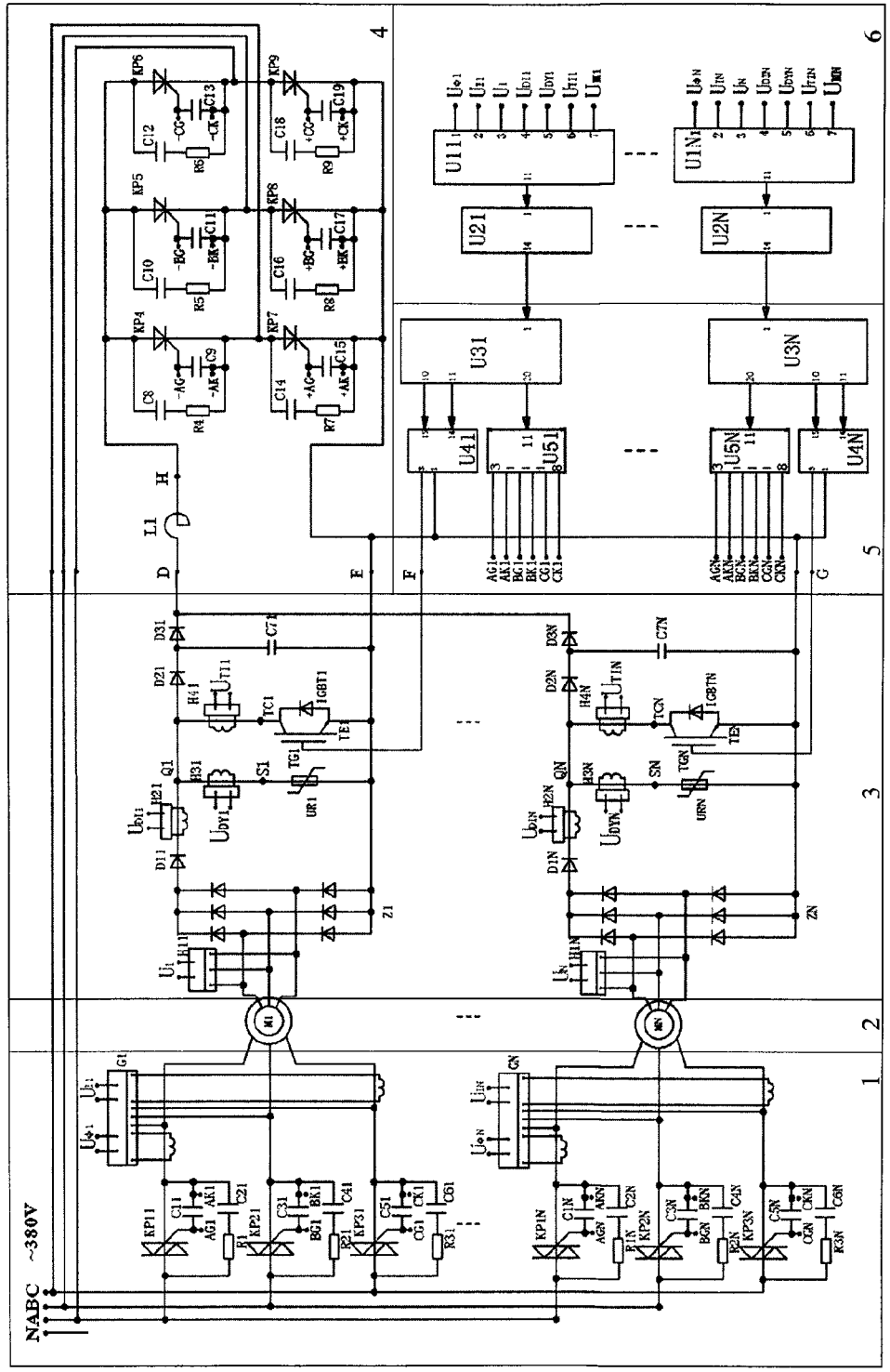
FIG. 2 is a circuit diagram showing the interconnection between the six units of the invention.

As shown in FIG. 1 and FIG. 2, the invention is consisted of a stator voltage-regulating unit 1, an electric motor unit 2, a rotor speed-regulating unit 3, an inverter bridge unit 4, a controlling and driving unit 5 and a signal processing unit 6, wherein:

the stator voltage-regulating unit 1 includes a plurality of stator voltage-regulating modules, i.e., the first stator voltage-regulating module 1.1 to the $N^{th}$ stator voltage-regulating module 1.N; here, N represents an integer greater than 1.

Figure 3:
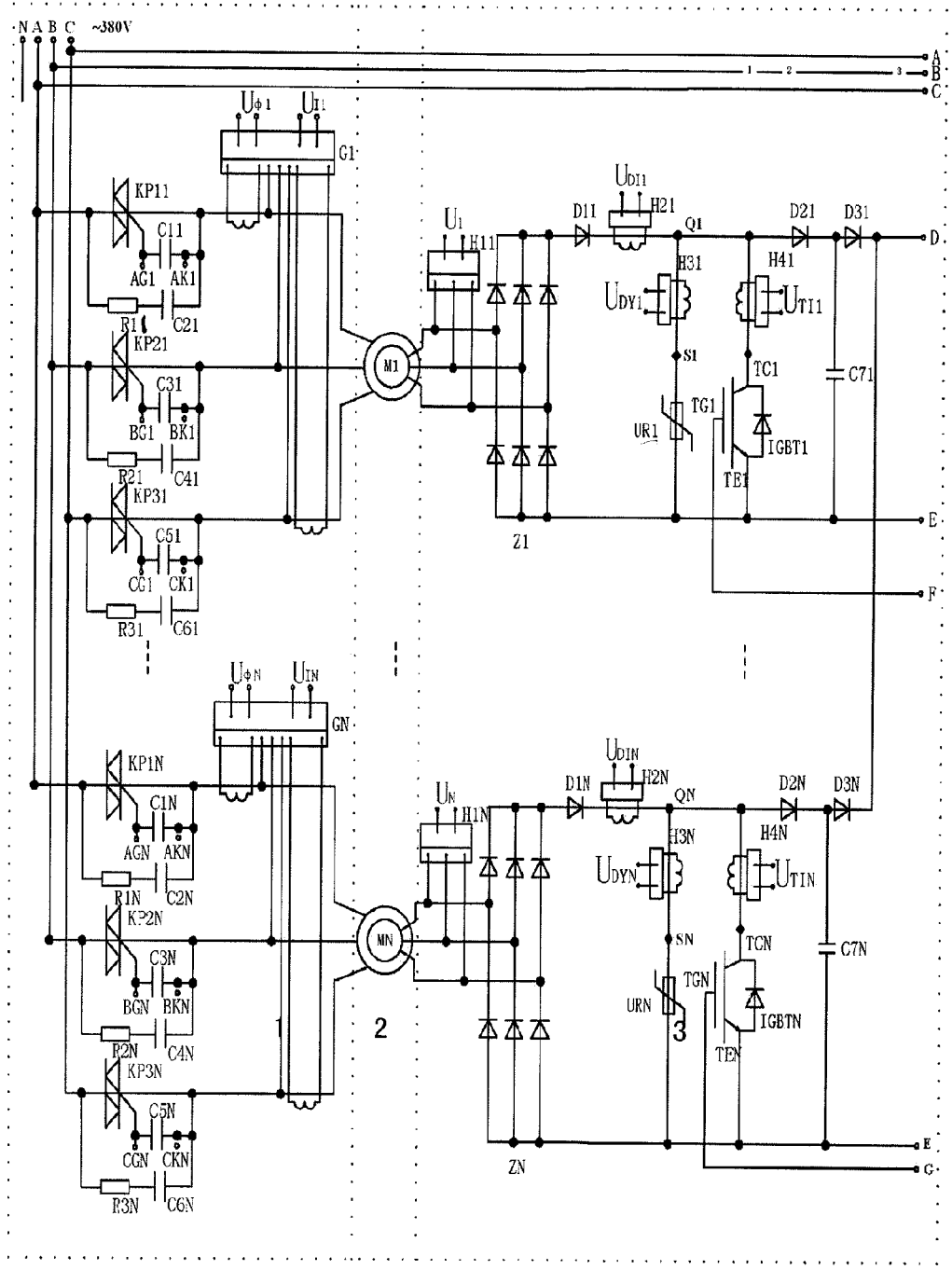
FIG. 3 is an amplified circuit diagram of the $1^{st}$, the $2^{nd}$ and the $3^{rd}$ units of the invention.

As shown in FIG. 3, the first stator voltage-regulating module 1.1 is provided with a stator voltage regulator group KP11, KP21, KP31, a resistor group R11, R21, R31, and a capacitor group C11, C21, C31, C41, C51 and C61; these components are divided into three blocks: the first block includes KP11, R11, C11, C21, the second block includes KP21, R21, R31, R41, and the third block includes KP31, R31, R41, R51, R61. The input ends of these three block are connected with the three phases ABC of the electric grid power respectively, while the output ends thereof are connected with the three stators of the first electric motor M1. Moreover, a power factor sensor G1 is provided on the three-phase power lines that connected with the three stators;

Similarly, as shown in FIG. 3 the $N^{th}$ stator voltage-regulating module 1.N is provided with a stator voltage regulator group KP1N, KP2 N, KP3 N, a resistor group R1N, R2 N, R3 N, and a capacitor group C1N, C2 N, C3 N, C4 N, C5 N and C6 N; these components are divided into three blocks: the first block includes KP1 N, R1 N, C1 N, C2 N, the second block includes KP2 N, R2 N, R3 N, R4 N, and the third block includes KP3 N, R3 N, R4 N, R5 N, R6 N. The input ends of each block are connected with the three phases ABC of the electric grid power respectively, while the output ends thereof are connected with the three stators of the first electric motor M1. Moreover, a power factor sensor GN is provided on the three-phase power lines connected with the three stators.

As shown in FIG. 3, the electric motor unit 2 include a plurality of electric motors, i.e., the first electric motor M1 to the $N^{th}$ electric motor MN. The three stators of the first electric motor M1 are connected respectively with the respective output end of the three stator voltage regulators KP11, KP21 and KP31 in the first stator voltage-regulating module 1.1; and the three rotors of the first electric motor M1 are connected respectively with the three input ends of the rectifier Z1 in the first speed-regulating module 3.1. Similarly, the three stators of the $N^{th}$ electric motor MN are connected respectively with the respective output end of the three stator voltage regulators KP1N, KP2N and KP3N in the $N^{th}$ stator voltage-regulating module 1.N, and the three rotors of the $N^{th}$ electric motor MN are connected respectively with the three input ends of the rectifier ZN in the $N^{th}$ speed-regulating module 3.N.

As shown in FIG. 3, the rotor speed-regulating unit 3 includes a plurality of speed-regulating modules, i.e., the first rotor speed-regulating module 3.1 to the $N^{th}$ rotor speed-regulating module 3.N;

As shown in FIG. 3, the first rotor speed-regulating module 3.1 is provided with a rectifier Z1, a chopper IGBT1, an overvoltage protector UR1, an isolator group D11, D21, D31 and a filtering capacitor C71. A hall voltage sensor H11 is provided on the three input ends of the rectifier Z1 and the three-phase power lines of the three rotors of the electric motor M1. A hall current sensor H21 is provided between the cathode of the isolator D11 and the anode Q1 of the isolator D21. A hall current sensor H31 is provided between the anode Q1 of the isolator and the upper point S1 of the overvoltage protector UR1. A hall current sensor H41 is provided between the anode Q1 of the isolator D21 and the anode TC1 of the chopper IGBT1.

Similarly, as shown in FIG. 3, the $N^{th}$ rotor speed-regulating module 3.N is provided with a rectifier $Z_N$, a chopper IGBTN, an overvoltage protector URN, an isolator group D1N, D2N, D3N and a filtering capacitor C7N. A hall voltage sensor H1N is provided on the three input ends of the rectifier ZN and the three-phase power lines of the three rotors of the first electric motor MN. A hall current sensor H2N is provided between the cathode of the isolator DN and the anode QN of the isolator D2N. A hall current sensor H3N is provided between the anode QN of the isolator and the upper point SN of the overvoltage protector. A hall current sensor H4N is provided between the anode QN of the isolator D2N and the anode TCN of the chopper IGBTN. The rotor speed-regulating unit 3 is used for detecting the rotor voltage and the chopper current as input voltage control signals, and then adjusting the input power by controlling the input voltage so as to make the input power change with the change of the rotating speed.

Figure 4:
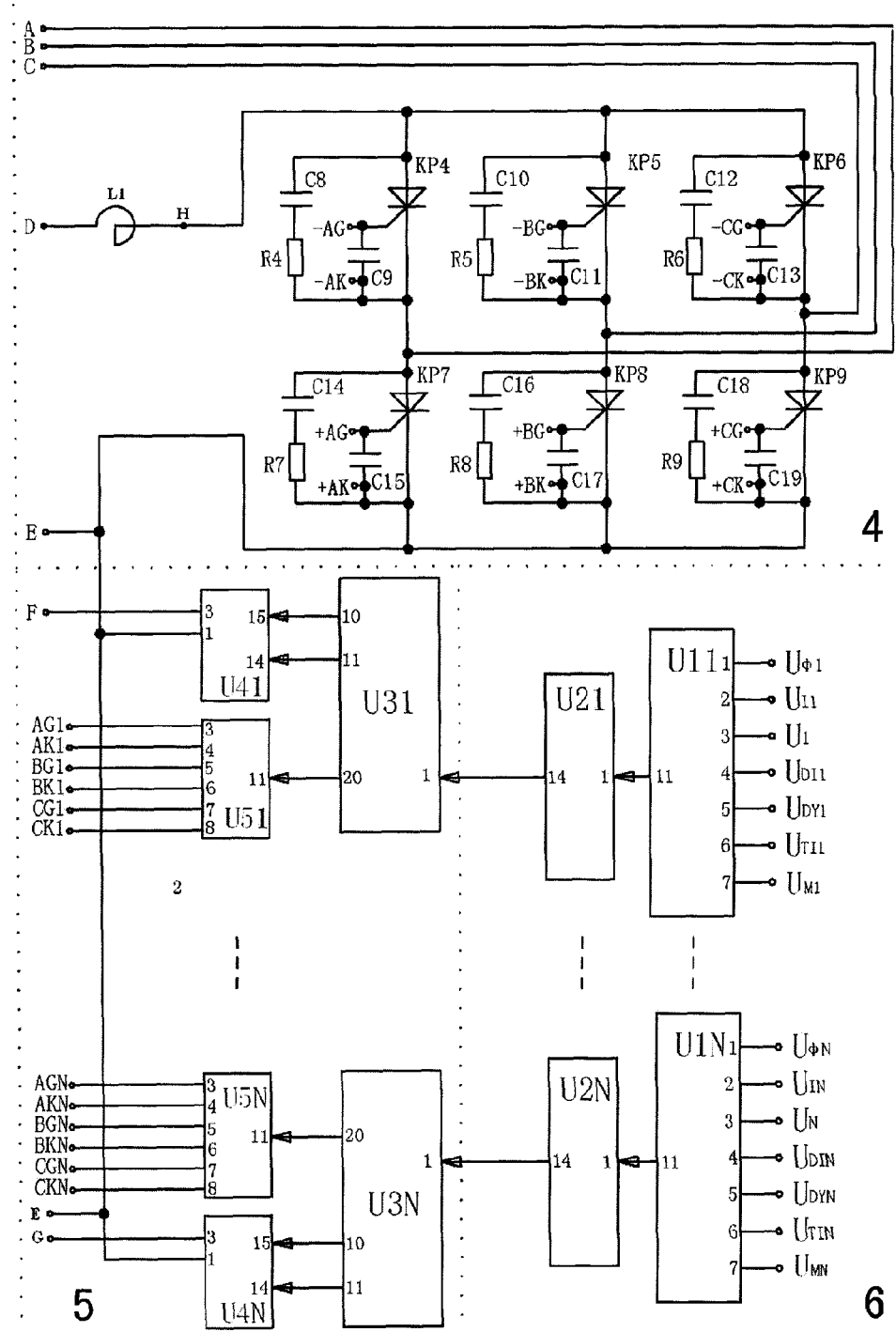
FIG. 4 is an amplified circuit diagram of the $4^{th}$, the $5^{th}$ and the $6^{th}$ units of the invention.

As shown in FIG. 4, the inverter bridge unit 4 includes: a reactor L1; silicon-controlled rectifier groups KP4 and KP7, KP5 and KP8, KP6 and KP9; resistor groups R4 and R7, R5 and R8, R6 and R9; and capacitor groups C8, C9 and C14, C15; C10, C11 and C16, C17; C12, C13 and C18, C19; wherein, the H point of the reactor L1 is connected with the anodes of the silicon-controlled rectifier group KP4, KP5, KP6, while the connection points of the silicon controlled rectifier groups KP4 and KP7, KP5 and KP8, KP6 and KP9 are connected with the terminals A, B and C of a three-phase electric grid power, respectively. The inverter bridge unit 4 is used for rectifying the AC current signals having different frequencies, which are output from the rotors of each functional electric motor, into DC signals, and then, inverting the DC signals into AC current signals having the same frequency and phase as those of the electric grids, and feeding the electrical energy of the AC current signals back to the electric grid or the electric motors.

As shown in FIG. 4, the controlling and driving unit 5 comprises a plurality of controlling and driving modules, i.e., the first controlling and driving module 5.1 to the $N^{th}$ controlling and driving module 5.N.

The first controlling and driving module 5.1 is provided with a microprocessor U31, an amplifying driver U41 and a triggering driver U51. The $10^{th}$ pin and the $11^{th}$ pin of the microprocessor U31 are connected with the $15^{th}$ pin and the $14^{th}$ pin of the amplifying driver U41, respectively. The $3^{rd}$ pin of the amplifying driver U41 and the gate TG1 of the chopper $IGBT_1$ in the first rotor speed-regulating module 3.1 are connected at a third point F. The $20^{th}$ pin of the microprocessor is connected with the $11^{th}$ pin of the triggering driver U51, and the $3^{rd}, 4^{th}, 5^{th}, 6^{th}, 7^{th}, 8^{th}$ pins of the triggering driver U51 are in turn connected directly with each point of AG1, AK1, BG1, BK1, CG1, CK1 in the first stator voltage-regulating module 1.1, respectively.

As shown in FIG. 4, the $N^{th}$ controlling and driving module 5.N is provided with a microprocessor U3N, an amplifying driver U4N and a triggering driver U5N. The $10^{th}$ pin and $11^{th}$ pin of the microprocessor U3N are connected with the $15^{th}$ pin and the $14^{th}$ pin of the amplifying driver U4N, respectively. The $3^{rd}$ pin of the amplifying driver U4N and the gate TGN of the chopper IGBTN in the first rotor speed-regulating module 3.N are connected at a fourth point G. The $20^{th}$ pin of the microprocessor is connected with the $11^{th}$ pin of the triggering driver U5N, and the $3^{rd}, 4^{th}, 5^{th}, 6^{th}, 7^{th}, 8^{th}$ pins of the triggering driver U5N are in turn connected directly with each point of AGN, AKN, BGN, BKN, CGN, CKN in the first stator voltage-regulating module 1.N, respectively. The controlling and driving unit 5 is used for receiving digital signals from the signal processing unit 6, performing digital processing, amplifying and driving, performing real time controlling of stator voltage-regulating unit and the rotor speed-regulating unit, and realizing a real-time control for changing the input power according to both the load and the rotating speed.

As shown in FIG. 4, the signal processing unit 6 includes a plurality of signal processing modules, i.e., the first signal processing module 6.1 to the $N^{th}$ signal processing module 6.N.

The first signal processing module 6.1 is provided with a signal processor U11 and an analog-to-digital converter U21, and the analog-to-digital converter U21 is connected with the microprocessor U31 of the first controlling and driving module 5.1.

The $N^{th}$ signal processing module 6.N is provided with a signal processor UN and an analog-to-digital converter U2N, and the analog-to-digital converter U2N is connected with the microprocessor U3N of the first controlling and driving module 5.N.

A phase voltage U1 of any two phases in the three stators of the first electric motor M1, and a DC voltage UI1 which is converted from a phase current of any one phase in the three stators of the first electric motor M1, are respectively provided to the 1$^{st}$ pin and the 2$^{nd}$ pin of the input end of the signal processor U11 of the first signal processing module 6.1.

A phase voltage UN of any two phases in the three stators of the first electric motor MN, and a DC voltage UIN which is converted from a phase current of any one phase in the three stators of the first electric motor MN, are respectively provided to the 1$^{st}$ pin and the 2$^{nd}$ pin of the input end of the signal processor U1N of the first signal processing module 6.N.

A phase voltage U1 of any two phases in the three stators of the first electric motor M1 and a phase voltage UN of any two phases in the three stators of the N$^{th}$ electric motor MN are provided to the 3$^{rd}$ pin of the input end of the signal processor U11 in the first signal processing module 6.1 and the 3$^{rd}$ pin of the signal processor U1N in the N$^{th}$ signal processing module 6.N, respectively.

As shown in FIG. 3 and FIG. 4, DC voltages UDI1 and UDIN, which are respectively converted from the output DC current of the rectifier Z1 in the first rotor speed-regulating module 3.1 and the output DC current of the rectifier ZN in the N$^{th}$ rotor speed-regulating module 3.N, are provided to the 4$^{th}$ pin of the input end of the signal processor U11 in the first signal processing module 6.1 and the 4$^{th}$ pin of the input end of the signal processor U1N in the N$^{th}$ signal processing module 6.N, respectively.

As shown in FIG. 3 and FIG. 4, DC voltages UDY1 and UDYN, which are respectively converted from the current that flows through the overvoltage protector UR1 in the first rotor speed-regulating module 3.1 and the current that flows through the overvoltage protector URN in the N$^{th}$ rotor speed-regulating module 3.N, are respectively provided to the 5$^{th}$ pin of the input end of the signal processor U11 in the first signal processing module 6.1 and the 5$^{th}$ pin of the input end of the signal processor U1N in the N$^{th}$ signal processing module 6.N.

DC voltages UTI1 and UTIN, which are respectively converted from the current flowing through the chopper IGBT1 in the first rotor speed-regulating module 3.1 and the current flowing through the chopper IGBTN in the N$^{th}$ rotor speed-regulating module 3.N, are respectively provided to the 6$^{th}$ pin of the input end of the signal processor U11 in the first signal processing module 6.1 and the 6$^{th}$ pin of the input end of the signal processor U1N in the N$^{th}$ signal processing module 6.N.

The cathode of the isolator D31 in the first rotor speed-regulating module 3.1 and the cathode of the isolator D3N in the N$^{th}$ rotor speed-regulating module 3.N are connected at a first point D with the input end of the reactor L1 in the inverter bridge unit 4.

The cathode TE1 of the chopper IGBT1 in the first rotor speed-regulating module 3.1 and the cathode TEN of the chopper IGBTN in the N$^{th}$ rotor speed-regulating module 3.N are connected at a second point E with the respective cathodes of the silicon-controlled rectifier group KP7, KP8, KP9 in the inverter bridge unit 4, the first pin of the amplifying driver U41 in the first controlling and driving module 5.1 and the first pin of the amplifying driver U4N in the N$^{th}$ controlling and driving module 5.N.

The model number, specification and function of the main devices in each unit of the invention are as follows:

G1 to GN are power factor sensors, with a model number of WB9128, for detecting the phase voltage and phase current signal of the stators of an electric motor.

KP11-KP31 or KP1N-KP3N is a stator voltage regulator group, with a model number of KP500 300A/1800V bi-directional silicon-controlled rectifier, for adjusting the stator voltage of an electric motor.

H11 or H1N is a hall voltage sensor, with a model number of VSM025A, for detecting the rotor voltage, which representing the rotor rotating speed of the electric motor.

H31 or H3N is a hall leakage current, with a model number of QDC21LTA, for detecting the DC bus overvoltage signal generated by the leakage current that flows through the piezoresistor of the overvoltage protector UR1 or URN.

H21, H41 or H2N, H4N are hall current sensors, with a model number of CSM300LT, for detecting the corresponding DC bus current and chopper current.

$IGBT_1$ or $IGBT_N$ is a chopper, with a model number of GD300HFL120C2S, for adjusting the rotor current, i.e., the rotating speed of the electric motor.

KP4-KP9 are silicon-controlled rectifiers, with a model number of KP500, 300/1800V, for building an inverter bridge which feeds the DC energy back to the electric grid or electric motors.

U31 or U3N is a microprocessor, with a model number of ATMEGA64, for receiving a system state signal, performing data processing, issuing an instruction, and providing a system control signal.

U41 or U4N is an amplifying drivers, with a model number of EX841, for receiving a microprocessor signal, generating a PWM signal required by the chopper, thereby adjusting the rotor rotating speed.

U51 or U5N is a triggering driver, with a model number of LSJK-T3SCRH, for receiving a microprocessor instruction, generating a trigger signal required by the bidirectional silicon controlled rectifier of the stator voltage regulator, thereby adjusting the stator voltage.

U11 or U1N is a signal processor, with a model number of LM258, for collecting signals detected by each sensor of the system and the on-line working main command voltage signal, processing the signals into the analog signals, and then converting the analog signals by an analog-to-digital converter into the digital signals that can be processed by the microprocessor.

The rest parts are all industrially interchangeable parts.

The above embodiments are only preferred embodiments of the invention, which are used for illustrating the technical characteristics and implementability of the invention, rather than limiting the patent scope of the invention. Meanwhile, one skilled in the art can understand and implement the above description. Therefore, all equivalent variations or modifications without departing from the disclosure of the invention fall into the scope of the claims of the invention.

The invention claimed is:

1. A control system for changing an input power according to both a load and a rotating speed by driving multiple electric motors via one inverter bridge, the control system comprising: a stator voltage-regulating unit (1) the output ends of which are connected with stators of an electric motor (2), a rotor speed-regulating unit (3), an inverter bridge unit (4), a controlling and driving unit (5) and a signal processing unit (6), wherein:
the stator voltage-regulating unit (1) whose rotors are connected with the rotor speed-regulating unit (3) comprises a plurality of stator voltage regulating modules, from the first stator voltage regulating module (1.1) to the N$^{th}$ stator voltage regulating module (1.N);

the electric motor unit (2) comprises a plurality of electric motors, from the first electric motor (M1) to the $N^{th}$ electric motor (MN);

the rotor speed-regulating unit (3) comprises a plurality of rotor speed-regulating modules, from the first rotor speed-regulating module (3.1) to the $N^{th}$ rotor speed-regulating module (3.N);

the inverter bridge unit (4) connected with the rotor speed-regulating unit (3) comprises: an reactor L1; silicon-controlled rectifier groups KP4 and KP7, KP5 and KP8, KP6 and KP9; resistor groups R4 and R7, R5 and R8, R6 and R9; capacitor groups C8, C9 and C14, C15; C10, C11 and C16, C17; C12, C13 and C18, C19; wherein, an H point of the reactor L1 is connected with an anode of the silicon-controlled rectifier groups KP4, KP5 and KP6, while the connecting point of the silicon controlled rectifier groups KP4 and KP7, the connecting point of the silicon controlled rectifier groups KP5 and KP8 and the connecting point of the silicon controlled rectifier groups KP6 and KP9 are connected with terminals A, B and C of a three-phase electric grid power, respectively;

the controlling and driving unit (5) for receiving digital signals from the signal processing unit (6) and controlling the stator voltage-regulating unit (1) and the rotor speed-regulating unit (3) comprises a plurality of driving and controlling modules, from the first controlling and driving module (5.1) to the $N^{th}$ controlling and driving module (5.N); and the signal processing unit (6) for receiving related signals detected by each sensor of the stator voltage-regulating unit (1) and the rotor speed-regulating unit (2) and performing signal processing and analog-digital conversion comprises a plurality of signal processing modules, from the first signal processing module (6.1) to the $N^{th}$ signal processing module (6.N)

wherein, a phase voltage $U\phi 1$ of any two phases in the three stators of the first electric motor M1, and a DC voltage UI1 which is converted from a phase current of any one phase in the three stators of the first electric motor M1, are respectively provided to the $1^{st}$ pin and the $2^{nd}$ pin of the input end of the signal processor U11 of the first signal processing module (6.1);

a phase voltage $U\phi N$ of any two phases in the three stators of the $N^{th}$ electric motor MN, and a DC voltage UIN which is converted from a phase current of any one phase in the three stators of the first electric motor MN, are respectively provided to the $1^{st}$ pin and the $2^{nd}$ pin of the input end of the signal processor U1N of the $N^{th}$ signal processing module (6.N); and a phase voltage U1 of any two phases in the three stators of the first electric motor M1 and a phase voltage UN of any two phases in the three stators of the $N^{th}$ electric motor MN are provided to the $3^{rd}$ pin of the input end of the signal processor U11 in the first signal processing module (6.1) and the $3^{rd}$ pin of the signal processor U1N in the $N^{th}$ signal processing module (6.N), respectively.

2. The control system for changing an input power according to both a load and a rotating speed by driving multiple electric motors via one inverter bridge according to claim 1, wherein:

the first stator voltage-regulating module (1.1) is provided with a stator voltage regulator group KP11, KP21 and KP31, a resistor group R11, R21, R31, and a capacitor group C11, C21, C31, C41, C51 and C61; the stator voltage regulator group, the resistor group and the capacitor group are divided into three blocks, the first block includes KP11, R11, C11, C21, the second group includes KP21, C21, C31, C41 and the third block includes KP31, R31, C51, C61; the input ends of the three blocks are connected with the three phases ABC of the electric grid power respectively, while the output ends thereof are connected with the three stators of the first electric motor M1 respectively; a power factor sensor G1 is provided on the three-phase power lines that connected with the three stators;

the $N^{th}$ stator voltage-regulating module (1.N) is provided with stator voltage regulator group KP1N, KP2N, KP3N, resistors R1N, R2N, R3N, and capacitor groups C1N, C2N, C3N, C4N, C5N, C6N; the stator voltage regulator group, the resistor group and the capacitor group are divided into three blocks, the first block includes KP1N, R1N, C1N, C2N, the second block includes KP2N, C2N, C3N, C4N, the third block includes KP3N, R3N, C5N, C6N; the input ends of these three blocks are connected with the three phases ABC of the electric grid power respectively, while the output ends of these three blocks are connected with the three stators of the first electric motor M1; a power factor sensor GN is provided on the three-phase power lines that connected with the three stators.

3. The control system for changing an input power according to both a load and a rotating speed by driving multiple electric motors via one inverter bridge according to claim 1, wherein:

the three stators of the first electric motor M1 are connected respectively with the respective output end of the three stator voltage regulators KP11, KP21 and KP31 in the first stator voltage-regulating module (1.1), and the three rotors of the first electric motor M1 are connected respectively with three input ends of the rectifier Z1 in the first rotor speed-regulating module (3.1);

the three stators of the $N^{th}$ electric motor MN are connected respectively with the respective output end of the three stator voltage regulators KP1N, KP2N and KP3N in the $N^{th}$ stator voltage-regulating module (1.N), and the three rotors of the $N^{th}$ electric motor MN are connected respectively with the three input ends of the rectifier ZN in the $N^{th}$ rotor speed-regulating module (3.N).

4. The control system for changing an input power according to both a load and a rotating speed by driving multiple electric motors via one inverter bridge according to claim 1, wherein:

the first rotor speed-regulating module (3.1) is provided with a rectifier Z1, a chopper IGBT1, an overvoltage protector UR1, an isolator group D11, D21, D31 and a filtering capacitor C71; a hall voltage sensor H11 is provided on the three input ends of the rectifier Z1 and the three-phase power lines of the three rotors of the electric motor M1; a hall current sensor H21 is provided between the cathode of the isolator D11 and the anode Q1 of the isolator D21; a hall current sensor H31 is provided between the anode Q1 of the isolator and the upper point S1 of the overvoltage protector UR1; and a hall current sensor H41 is provided between the anode Q1 of the isolator D21 and the anode TC1 of the chopper IGBT1;

the $N^{th}$ rotor speed-regulating module (3.N) is provided with a rectifier ZN, a chopper IGBTN, an overvoltage protector URN, an isolator group D1N, D2N, D3N and a filtering capacitor C7N; a hall voltage sensor H1N is provided on the three input ends of the rectifier ZN and the three-phase power lines of the three rotors of the first electric motor MN; a hall current sensor H2N is provided between the cathode of the isolator DN and the anode QN of the isolator D2N; a hall current sensor H3N is provided between the anode QN of the isolator and the upper point SN of the overvoltage protector; and a hall current sensor H4N is provided between the anode QN point of the isolator D2N and the anode TCN of the chopper IGBTN.

5. The control system for changing an input power according to both a load and a rotating speed by driving multiple electric motors via one inverter bridge according to claim 1, wherein:
the first controlling and driving module (5.1) is provided with a microprocessor U31, an amplifying driver U41 and a triggering driver U51; the $10^{th}$ pin and the $11^{th}$ pin of the microprocessor U31 are connected with the $15^{th}$ pin and the $14^{th}$ pin of the amplifying driver U41, respectively; the $3^{rd}$ pin of the amplifying driver U41 and the gate TG1 of the chopper $IGBT_1$ in the first rotor speed-regulating module 3.1 are connected at a third point F; the $20^{th}$ pin of the microprocessor is connected with the $11^{th}$ pin of the triggering driver U51, and the $3^{rd}$, $4^{th}$, $5^{th}$, $6^{th}$, $7^{th}$, $8^{th}$ pins of the triggering driver U51 are connected directly with each point of AG1, AK1, BG1, BK1, CG1, CK1 in the first stator voltage-regulating module 1.1, respectively;
the $N^{th}$ controlling and driving module (5.N) is provided with a microprocessor U3N, an amplifying driver U4N and a triggering driver U5N; the $10^{th}$ pin and $11^{th}$ pin of the microprocessor U3N are connected with the $15^{th}$ pin and the $14^{th}$ pin of the amplifying driver U4N, respectively; the $3^{rd}$ pin of the amplifying driver U4N and the gate TGN of the chopper IGBTN in the first rotor speed-regulating module (3.N) are connected at the fourth point G; the $20^{th}$ pin of the microprocessor is connected with the $11^{th}$ pin of the triggering driver U5N, and the $3^{rd}$, $4^{th}$, $5^{th}$, $6^{th}$, $7^{th}$, $8^{th}$ pins of the triggering driver U5N are connected directly with each point of AGN, AKN, BGN, BKN, CGN, CKN in the first stator voltage-regulating module 1.N, respectively.

6. The control system for changing an input power according to both a load and a rotating speed by driving multiple electric motors via one inverter bridge according to claim 1, wherein:
the first signal processing module (6.1) is provided with a signal processor U1f and an analog-to-digital converter U21, and the analog-to-digital converter U21 is connected with the microprocessor U31 in the first controlling and driving module;
the $N^{th}$ signal processing module (6.N) is provided with a signal processor U1N and an analog-to-digital converter U2N, and the analog-to-digital converter U2N is connected with the microprocessor U3N in the first controlling and driving module (5.1).

7. The control system for changing an input power according to both a load and a rotating speed by driving multiple electric motors via one inverter bridge according to claim 1, wherein:
DC voltages UDI1 and UDIN, which are respectively converted from the output DC current of the rectifier Z1 in the first rotor speed-regulating module (3.1) and the output DC current of the rectifier ZN in the $N^{th}$ rotor speed-regulating module (3.N), are respectively provided to the $4^{th}$ pin of the input end of the signal processor U11 in the first signal processing module (6.1) and the $4^{th}$ pin of the input end of the signal processor U1N in the $N^{th}$ signal processing module (6.N).

8. The control system for changing an input power according to both a load and a rotating speed by driving multiple electric motors via one inverter bridge according to claim 1, wherein:
DC voltages UDY1 and UDYN, which are respectively converted from the current that flows through the overvoltage protector UR1 in the first rotor speed-regulating module (3.1) and the current that flows through the overvoltage protector URN in the $N^{th}$ rotor speed-regulating module (3.N), are respectively provided to the $5^{th}$ pin of the input end of the signal processor U11 in the first signal processing module (6.1) and the $5^{th}$ pin of the input end of the signal processor U1N in the $N^{th}$ signal processing module (6.N); and
DC voltages UTI1 and UTIN, which are respectively converted from the current that flows through the chopper IGBT1 in the first rotor speed-regulating module (3.1) and the current that flows through the chopper IGBTN in the $N^{th}$ rotor speed-regulating module (3.N), are respectively provided to the $6^{th}$ pin of the input end of the signal processor U11 in the first signal processing module (6.1) and the $6^{th}$ pin of the input end of the signal processor U1N in the $N^{th}$ signal processing module (6.N).

9. The control system for changing an input power according to both a load and a rotating speed by driving multiple electric motors via one inverter bridge according to claim 1, wherein:
the cathode of the isolator D31 in the first rotor speed-regulating module (3.1) and the cathode of the isolator D3N in the $N^{th}$ rotor speed-regulating module (3.N) are connected at a first point D with the input end of the reactor L1 in the inverter bridge unit 4;
the cathode TE1 of the chopper IGBT1 in the first rotor speed-regulating module (3.1) and the cathode TEN of the chopper IGBTN in the $N^{th}$ rotor speed-regulating module (3.N) are connected at a second point E with the respective cathodes of the silicon-controlled rectifier group KP7, KP8, KP9 in the inverter bridge unit (4), the first pin of the amplifying driver U41 in the first controlling and driving module (5.1) and the first pin of the amplifying driver U4N in the $N^{th}$ controlling and driving module (5.N).

\* \* \* \* \*